United States Patent
Panov et al.

(10) Patent No.: US 9,496,797 B2
(45) Date of Patent: Nov. 15, 2016

(54) BIDIRECTIONAL CONVERTERS AND FLUX-BALANCING CONTROL METHODS THEREOF

(71) Applicant: Delta Electronics, Inc., Neihu (TW)

(72) Inventors: Yuri Panov, Durham, NC (US); Milan M. Jovanovic, Cary, NC (US); Brian T. Irving, Hillsborough, NC (US)

(73) Assignee: DELTA ELECTRONICS, INC., Neihu (TW)

( * ) Notice: Subject to any disclaimer, the term of this patent is extended or adjusted under 35 U.S.C. 154(b) by 419 days.

(21) Appl. No.: 14/304,693

(22) Filed: Jun. 13, 2014

(65) Prior Publication Data

US 2015/0365005 A1    Dec. 17, 2015

(51) Int. Cl.
*H02M 3/335* (2006.01)
*H02M 1/40* (2007.01)
*H02M 11/00* (2006.01)

(52) U.S. Cl.
CPC ........... *H02M 3/33584* (2013.01); *H02M 1/40* (2013.01); *Y10T 307/352* (2015.04)

(58) Field of Classification Search
CPC .................................................. H02M 11/00
USPC ....................................................... 307/151
See application file for complete search history.

(56) References Cited

U.S. PATENT DOCUMENTS

| 3,870,943 A | 3/1975 | Weischedel et al. |
| 4,150,424 A | 4/1979 | Nuechterlein |
| 2013/0088895 A1 | 4/2013 | Ye et al. |

OTHER PUBLICATIONS

Ortiz, G., et al., "Flux Balancing of Isolation Transformers and Application of 'The Megnetic Ear' for Closed-Loop Volt-Second Compensation", article, IEEE Transactions on Power Electronics, 2013, 12 pages.

Ortiz, G., et al., "'Magnetic Ear'—Based Balancing of Magnetic Flux in High Power Medium Frequency Dual Active Bridge Converter Transformer Cores", IEEE, 8th International Conference on Power Electronics—ECCE Asia, May 30-Jun. 3, 2011, pp. 1307-1314.

Han, S., et al., "Preventing Transformer Saturation in Bi-Directional Dual Active Bridge Buck-Boost DC/DC Converters", IEEE, 2010, pp. 1450-1457.

Gertsman, A. and Ben-Yaakov, S., "Zeroing Transformer's DC Current in Resonant Converters with No Series Capacitors", IEEE, 2010, pp. 4028-4034.

Claassens, J. A. and Hofsajer, I. W., "A flux balancer for phase shift ZVS DC-DC converters under transient conditions", IEEE, 2006, pp. 523-527.

*Primary Examiner* — Robert Deberadinis
(74) *Attorney, Agent, or Firm* — VLP Law Group LLP; Edward C. Kwok

(57) ABSTRACT

A flux-balancing method for an isolated bidirectional converter uses a flux-balancing control loop and a current-balancing control loop to control the DC components in the primary and secondary currents. The flux-balancing control loop keeps the average magnetizing current substantially zero and the current-balancing control loop keeps the average primary current or the average secondary current substantially zero. The flux-balancing loop adjusts the duty ratio of a set of switches in a corresponding bridge. The adjusted duty ratio is designed to substantially eliminate the DC component in the magnetizing current. The current-balancing loop keeps the average primary current and the average secondary current substantially zero, and adjusts the duty ratio of the switches in a corresponding bridge to eliminate the corresponding DC component.

36 Claims, 5 Drawing Sheets

BIDIRECTIONAL CONVERTERS AND FLUX-BALANCING CONTROL METHODS THEREOF

BACKGROUND OF THE INVENTION

1. Field of the Invention

The present invention relates to methods for controlling isolated bidirectional power converters. More particularly, the present invention relates to methods for controlling dual-active-bridge (DAB) bidirectional converters.

2. Description of the Related Art

Bidirectional converters are increasingly being used in power systems with energy-storage capabilities, such as "smart-grid" and automotive applications. Generally, bidirectional converters are often used to condition charging and discharging of energy-storage devices, such as batteries and super-capacitors. For example, in automotive applications, isolated bidirectional dc-to-dc converters are used in electric vehicles (EVs) to provide bidirectional energy exchange between the high-voltage (HV) battery and the low-voltage (LV) batteries, while ac-to-dc bidirectional converters are expected to be used in future vehicle-to-grid (V2G) applications. Because a battery's operating voltage range depends on the battery's state of charge, achieving high efficiency across the entire operating voltage range of the battery is a major design challenge in bidirectional converter designs.

FIG. 1(a) is a block diagram showing the power stage and the control of a dual-active-bridge (DAB) converter, which is a topology widely used in bidirectional isolated converters. FIG. 1(b) shows timing waveforms of bridge voltages $V_{AB}$ and $V_{CD}$ for the DAB converter of FIG. 1(a). Also illustrated in FIG. 1(b) is phase-shift $\Phi$ between bridge voltages $V_{AB}$ and $V_{CD}$, which is used in the DAB converter to control power flow. When phase-shift $\Phi$ is positive, power flows from source $V_1$ to source $V_2$ (i.e., source $V_1$ delivers power while source $V_2$ receives power). When phase-shift $\Phi$ is negative, power flows in the reverse direction, so that source $V_2$ becomes the power source and source $V_1$ becomes the output device or the load. As the output side of a converter typically requires regulation, FIG. 1(a) shows a bidirectional DAB converter that includes two output or load feedback control loops for load control. At any given time, only one of these two output-control loops is active: (a) when phase-shift $\Phi$ is positive, the loop regulating source $V_2$ is active; and (b) when phase-shift $\Phi$ is negative, the loop regulating source $V_1$ is active. Depending on the characteristics or nature of sources $V_1$ and $V_2$ of FIG. 1(a), the output or load control loops may be set up for regulating respective voltages, currents or power.

Descriptions of various aspects of DAB converter performance optimization can be found in the technical literature, with most papers focused on efficiency improvements through power-stage refinements and advanced control techniques, such as duty-ratio modulation of the switches in the individual bridges. However, transformer saturation—which is an issue of paramount importance for reliable operation of isolated bidirectional converters—is not sufficiently addressed in the DAB converter literature, even though isolated bidirectional converters are more susceptible to transformer saturation than their unidirectional counterparts. Transformer saturation arises in bidirectional converters because the primary and secondary sides of the transformer are both connected to voltage sources. There are two major causes of volt-second imbalance across a transformer winding. The first is a duty cycle difference between the positive and negative periods of bridge voltage $V_{AB}$ (i.e., $D_{PP} \neq D_{PN}$), as well as a duty cycle difference between the positive and negative periods of bridge voltage $V_{CD}$ (i.e., $D_{SP} \neq D_{SN}$), or both (see, FIG. 1(b)). Such duty cycle differences may be caused by a mismatch in the timing of the drive signals of the switches in each bridge. The second cause of volt-second imbalance is a difference in positive and negative winding voltage of winding voltages (i.e., $V_{ABP} \neq V_{ABN}$, $V_{CDP} \neq V_{CDN}$, or both). The difference in winding voltage levels may be caused by unequal voltage drops across semiconductor switches. A volt-second imbalance creates an imbalance in the negative and positive flux changes in the magnetic core of the transformer, which eventually results in transformer saturation.

Generally, the passive and active approaches for eliminating transformer saturation that are applicable to unidirectional isolated full-bridge converters are also applicable to bidirectional converters. Passive approaches include (a) designing the transformer with the goals of a low peak flux density and a large core gap, so as to absorb the anticipated worst-case flux imbalance without saturating the core; and (b) adding blocking capacitors in series with the primary winding and/or the secondary winding of the transformer to eliminate DC currents. However, these passive approaches are not desirable because (a) designing a transformer too conservatively leads to a larger transformer core, or increases the peak value of the magnetizing current, thus increasing conduction and switching losses; and (b) adding blocking capacitors requires additional components, thereby increasing both the size and the cost of the converter.

For unidirectional isolated converters, many active approaches have been introduced that are based on sensing transformer currents and using the sensed signals to modify durations of the driving signals for the switches, thereby maintaining flux balance. Some examples include: (a) the article, "*A Flux Balancer for Phase-Shift ZVS Dc-Dc Converters under Transient Conditions*," by J. Claassens and I. Hofsajer, published in Proc. of IEEE Applied Power Electronics Conference (APEC), 2006, pp. 523-527; (b) U.S. Pat. No. 3,870,943, entitled "Converter Circuit with Correction Circuit to Maintain Signal Symmetry in the Switching Devices," by H. Weischedel and G. Westerman, issued Mar. 11, 1975; (c) U.S. Pat. No. 4,150,424, entitled "Dynamic Current Balancing for Power Converters," by P. Nuechterlein, issued Apr. 17, 1979; (d) U.S. Patent Application Publication 2013/0088895, entitled "Full Bridge Converter," by Z. Ye and S. Xu, published Apr. 11, 2013; and (e) the article, entitled "*Zeroing Transformer's DC Current in Resonant Converters with No Series Capacitors*," by A. Gertsman, and S. Ben-Yaakov, published in Proc. of IEEE Energy Conversion Congress and Exposition (ECCE), 2010, pp. 4028-4034.

Examples of methods of preventing transformer saturation in DAB converters include: (a) the article "'*Magnetic Ear*'—*Based Balancing of Magnetic Flux in High Power Medium Frequency Dual Active-Bridge Converter Transformer Cores*" ("Ortiz I"), by G. Ortiz, J. Mühlethaler, and J. W. Kolar, published in Proc. of IEEE 8$^{th}$ International Conference on Power Electronics, ECCE Asia Conference, 2011, pp. 1307-1314.; (b) the article "*Flux Balancing of Isolation Transformers and Application of 'The Magnetic Ear' for Closed-Loop Volt-Second Compensation*" ("Ortiz II"), by G. Ortiz, L. Fassler, J. W. Kolar, and, O. Apeldoorn, published in *IEEE Transactions on Power Electronics*, May-June 2013, pp. 1307-1314; and (c) the article "*Preventing Transformer Saturation in Bi-Directional Dual Active Bridge Buck-Boost DC/DC Converters*" ("Han"), by S. Han, I. Munuswamy, and D. Divan, published in Proc. of IEEE Energy Conversion Congress and Exposition (ECCE), 2010, pp. 1450-1455.

Ortiz I and Ortiz II each disclose a flux-density transducer which measures flux density in the core of the transformer and which eliminates its dc component by an active flux-balancing control loop. Ortiz I and Ortiz II also review both existing direct and indirect sensing and measurement methods for the magnetic flux in the core of a transformer, and passive and active methods for preventing core saturation.

Han discloses a method for preventing transformer saturation in a DAB-Buck-Boost (DAB$^3$) converter which uses an active flux-balancing method. Under that flux-balancing method, the DC components of the primary and secondary currents of the transformer are made substantially zero by sensing average primary and secondary currents and injecting signals proportional to their values into the sensed filter inductor current. Using a peak-current control approach, the inductor current is used to adjust and to maintain a flux-balance between the primary and secondary windings.

SUMMARY

According to one embodiment of this invention, a flux-balancing method for an isolated bidirectional converter uses a flux-balancing control loop and a current-balancing control loop to control the DC components in the primary and secondary currents. Under that method, the flux-balancing control loop keeps the average magnetizing current substantially zero and the current-balancing control loop keeps the average primary current and the average secondary current substantially zero. The flux-balancing loop calculates the average magnetizing current from the sensed primary and secondary currents and accordingly adjusts the duty ratio of a set of switches in a corresponding bridge. The adjusted duty ratio is designed to substantially eliminate the DC component in the magnetizing current. The current-balancing loop calculates an average of the sensed primary current or the sensed secondary current and accordingly adjusts the duty ratio of the switches in a corresponding bridge to eliminate DC component in the sensed current. Generally, the bandwidth of the flux-balancing control loop is much higher than that of the current-balancing loop.

Accordingly to another embodiment of the present invention, the flux-balancing control loop and the current-balancing control loop directly control and maintain the average primary current and the average secondary current to substantially zero. In this embodiment, a fast loop (i.e., a high bandwidth) is desired for each of these control loops.

The embodiments of the present invention can be implemented using either analog or digital control or both.

The present invention is better understood upon consideration of the following detailed description and accompanying figures.

BRIEF DESCRIPTION OF THE DRAWINGS

Like elements in the figures are assigned like reference numerals.

DETAILED DESCRIPTION OF THE PREFERRED EMBODIMENTS

Figure 1A:
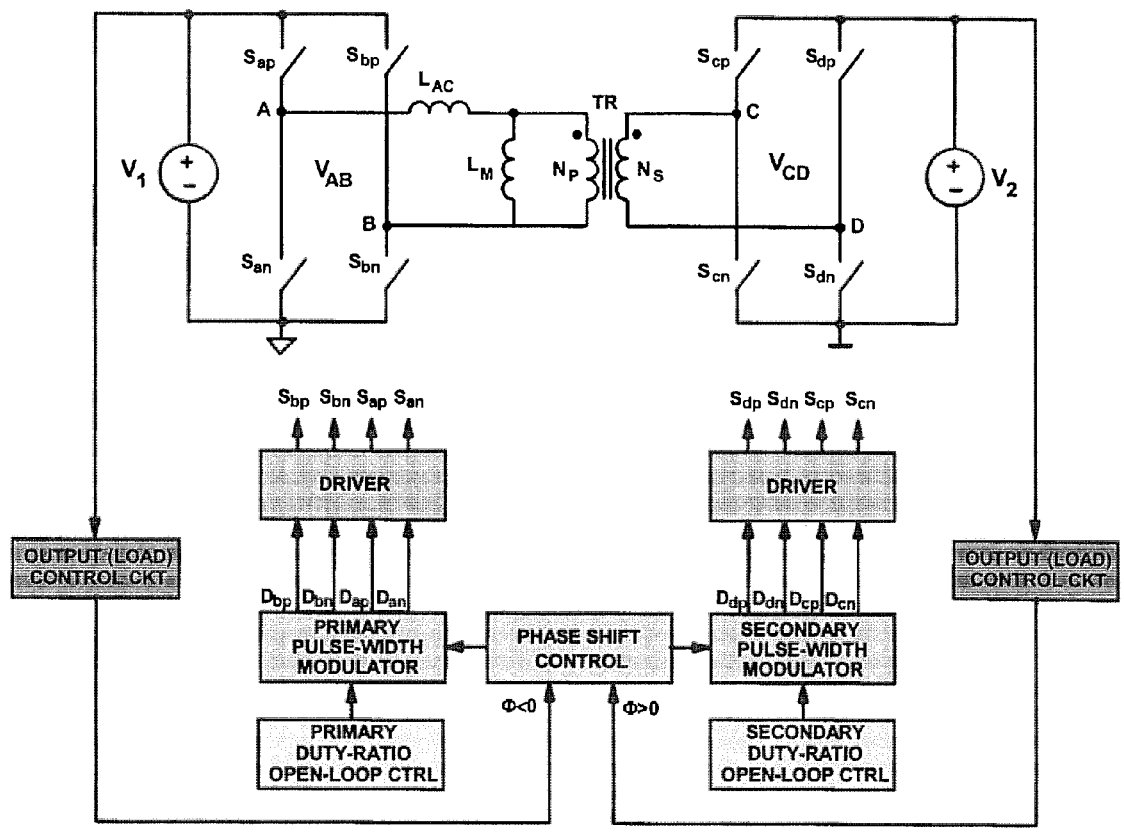
FIG. 1(a) is a block diagram showing the power stage and the control block of a dual-active-bridge (DAB) converter, which is a topology widely used in bidirectional isolated converters.
Figure 1B:
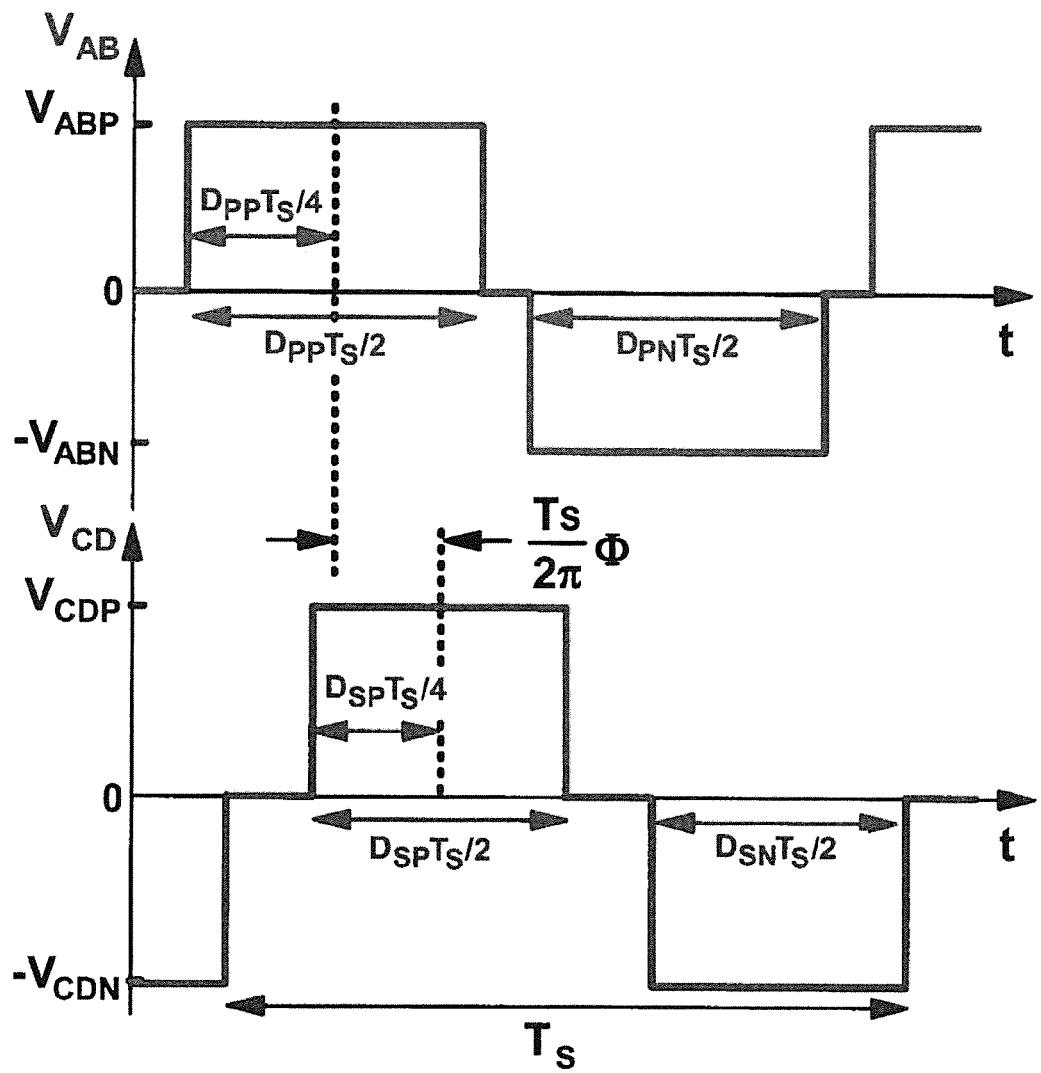
FIG. 1(b) shows timing waveforms of bridge voltages for the DAB converter of FIG. 1(a).
Figure 2:
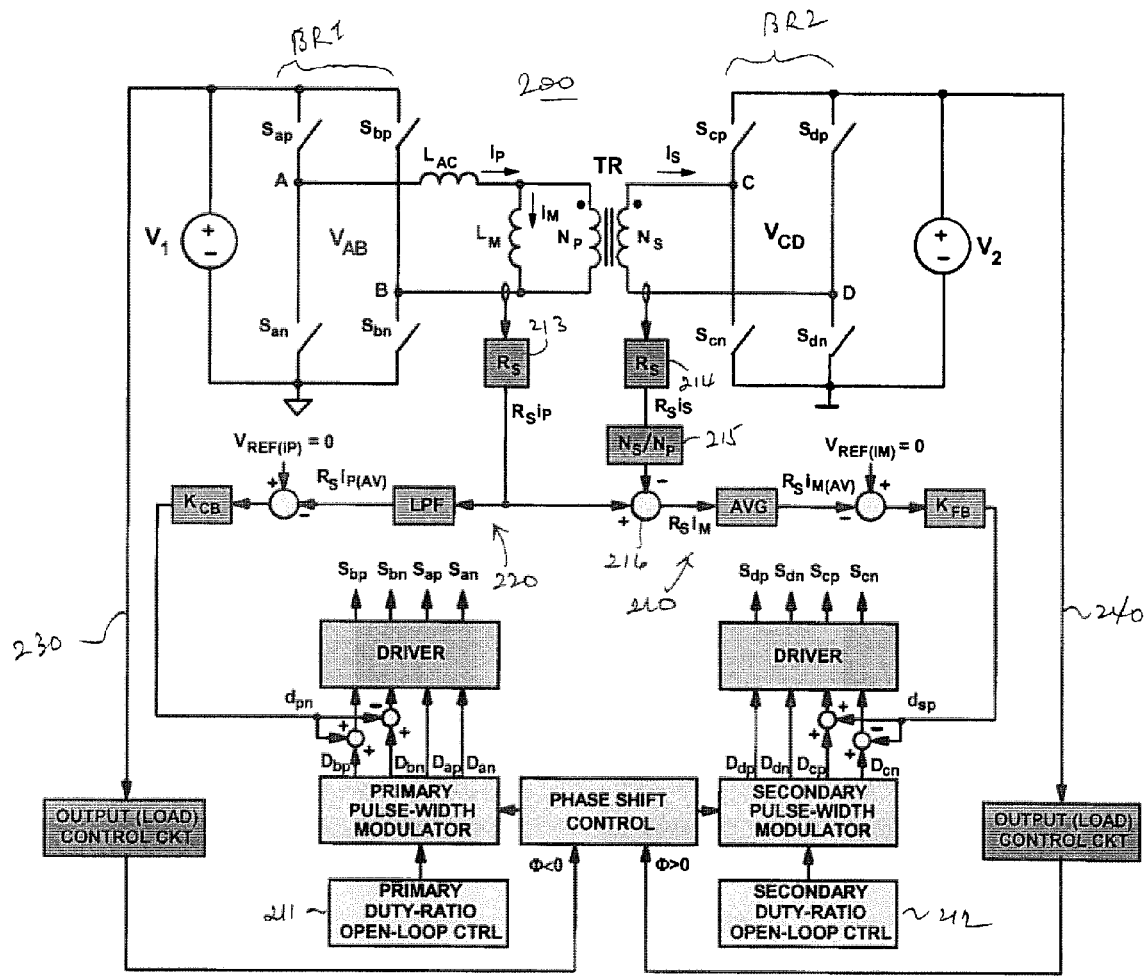
FIG. 2 shows DAB converter 200, in accordance with an exemplary embodiment of the present invention.

FIG. 2 shows DAB converter 200, in accordance with an exemplary embodiment of the present invention. As shown in FIG. 2, DAB converter 200 includes (a) isolation transformer TR, (b) inductor $L_{AC}$, (c) bridge BR1, which comprises switches $S_{ap}$, $S_{an}$, $S_{bp}$, and $S_{bn}$, and (d) bridge BR2, which comprises switches $S_{cp}$, $S_{cn}$, $S_{dp}$, and $S_{dn}$. Inductor $L_{AC}$ is coupled between source $V_1$ through bridge BR1 and one winding of transformer TR (arbitrarily denoted "the primary winding"). Another winding of transformer TR ("the secondary winding") is coupled to source $V_2$ through bridge BR2. Sources $V_1$ and $V_2$ can be any kind of DC power sources that can deliver and store (receive) energy, including batteries and super-capacitors.

In DAB converter 200, switches in the same leg of a bridge (e.g., switches $S_{ap}$ and $S_{an}$) operate in a complementary fashion—i.e., when one switch of the leg is closed the other switch of the leg is open and vice versa. In a practical application, to achieve zero-voltage-switching (ZVS) operation (i.e., each switch is to close at a time when the voltage across it is zero) and to minimize turn-on switching losses, a small dead time may be provided between the turning-off of one switch of one leg and the subsequent turning-on of the complementary switch in the same leg. FIG. 2 also shows explicitly magnetizing inductance $L_M$ of transformer TR in parallel with a primary winding of transformer TR. Magnetizing current $i_M$ can be directly measured or calculated from measured primary current $i_P$ and measured secondary current $i_S$ using relationship $$i_M = i_P - \frac{N_S}{N_P} i_S,$$

where $N_P$ and $N_S$ are the number of turns in the primary and the secondary windings, respectively.

FIG. 2 illustrates a control method applicable to DAB converter 200 implemented in current-control feedback loops 210 and 220, in addition to output feedback control loops 230 and 240, and primary-side and secondary-side duty-ratio open-loop control circuits 211 and 212. Current-control feedback loop 210 regulates average magnetizing current $i_{M(AV)}$ to substantially zero to avoid saturating transformer TR's magnetic core, while current-control feedback loop 220 regulates average primary current $i_{P(AV)}$ to substantially zero, so as to prevent unnecessary power losses in the primary and the secondary sides of DAB converter 200 caused by the DC components of primary current $i_P$ and secondary current $i_S$, and to prevent saturation of the magnetic core of inductor $L_{AC}$.

Current-control feedback loop 210 (the "flux balancing loop") includes current-sensing primary current $i_P$ and secondary current $i_S$ by current-sensing devices 213 and 214 (each shown in FIG. 2 with exemplary gain $R_S$). Scaler 215 scales the output value of current-sensing device 214 by the turns ratio $N_S/N_P$. Summer 216 subtracts the output value of scaler 215 (i.e., the scaled sensed secondary current ($N_S/N_P$)*$R_S$*$i_S$) from the output value of primary side current-sensing device 213 (i.e., $R_S$*$i_P$) to obtain sensed magnetizing current $R_S$*$i_M$. Sensed magnetizing current $R_S$*$i_M$ is then averaged by averaging circuit AVG to provide an average sensed magnetizing current, denoted by $R_S$*$i_{M(AV)}$. Average sensed magnetizing current $R_S$*$i_{M(AV)}$ is compared with reference voltage $V_{REF(iM)}$, which is set to substantially zero in this embodiment, for example. The difference between average sensed magnetizing current $R_S$*$i_{M(AV)}$ and voltage reference $V_{REF(iM)}$ is compensated by compensator circuit $K_{FB}$ whose output value $d_{sp}$ modulates the duty ratios of secondary-side switches $S_{cn}$ and $S_{cp}$, so as to constrain sensed magnetizing current $R_S$*$i_{M(AV)}$ to substantially reference voltage $V_{REF(iM)}$ (i.e. $R_S$*$i_{M(AV)} \approx V_{REF(iM)}$).

Figure 3:
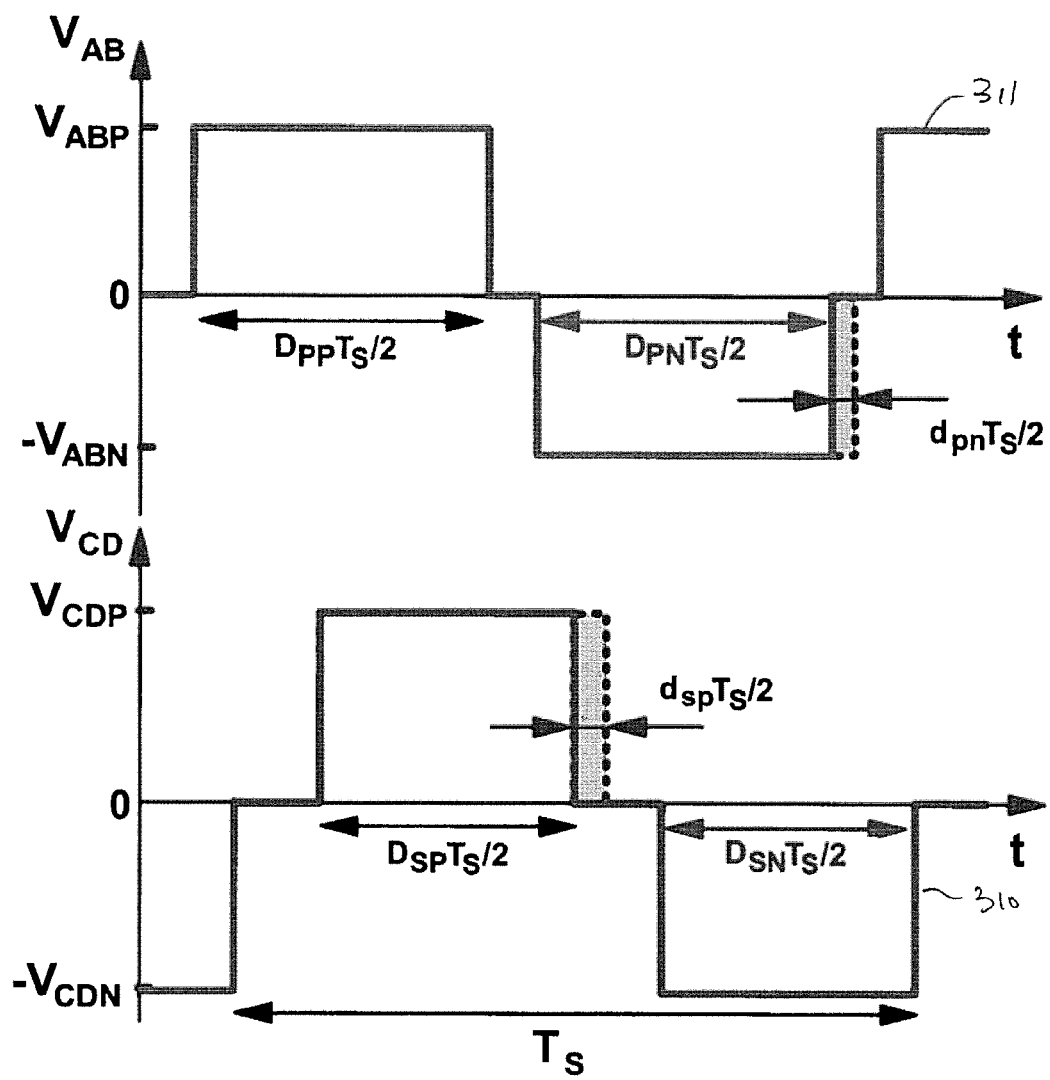
FIG. 3 illustrates the modulation of bridge voltages $V_{AB}$ and $V_{CD}$ by modulation of the duty ratios in primary-side switches $S_{bp}$ and $S_{bn}$ and secondary-side switches $S_{cp}$ and $S_{cn}$, in accordance with one embodiment of the present invention.

FIG. 3 illustrates the modulation of bridge voltage $V_{CD}$. As illustrated by waveform 310 of FIG. 3, when the duty ratio of switch $S_{cp}$ is changed by amount $d_{sp}$ and the duty ratio of switch $S_{cn}$ in the same leg of bridge BR2 is simultaneously changed by amount $-d_{sp}$, positive bridge voltage $V_{CDP}$ is modulated by $d_{sp}$. As shown in FIG. 3, modulation is not made during the negative half-periods of bridge voltage $V_{CD}$. With this one-sided modulation, the positive volt-second product across the secondary winding (and, therefore, magnetizing inductance $L_M$) is adjusted to balance the flux between the positive and negative half-periods, thereby maintaining sensed average magnetizing current $R_S$*$i_{M(AV)}$ substantially to zero.

Other variations of modulating a duty ratio of bridge voltage $V_{CD}$ different from that in DAB converter 200 of FIG. 2 are also possible. For example, secondary-side switches $S_{dn}$ and $S_{dp}$ can be modulated instead of switches $S_{cn}$ and $S_{cp}$, so that a duty ratio of bridge voltage $V_{CD}$ is modulated only during negative half periods. It is also possible to modulate all four switches of bridge BR2, so that the duty ratios of bridge voltage $V_{CD}$ are modulated in both the positive and negative half periods. In that case, the duty ratio modulations of $V_{CD}$ during positive and negative half periods are arranged so that the volt-second product changes during the two halves of the switching period are adjusted in opposite directions. Furthermore, any duty-ratio modulation technique such as trailing edge (e.g., such as shown in FIG. 3), leading edge, and double sided can be used.

As shown in FIG. 2, current-control feedback loop 220 ("current-balancing loop") regulates primary current $i_P$ by averaging sensed primary current $R_S$*$i_P$ using low-pass filter LPF to provide average sensed primary current $R_S$*$i_{P(AV)}$, which is then compared with substantially zero reference voltage $V_{REF(iP)}$. The difference between average sensed primary current $R_S$*$i_{P(AV)}$ and reference voltage $V_{REF(iP)}$ is compensated by compensator $K_{CB}$ whose output value modulates the duty ratios of secondary-side switches $S_{bn}$ and $S_{bp}$, so as to maintain sensed primary current $R_S$*$i_{P(AV)}$ at substantially reference voltage $V_{REF(iP)}$ (i.e. $R_S$*$i_{P(AV)} \approx V_{REF(iP)}$). By maintaining both magnetizing current $i_M$ and primary current $i_P$ close to zero by current-control feedback loops 210 and 211, the average secondary current, $R_S$*$i_{S(AV)}$, which is proportional to the difference between currents $i_M$ and $i_P$ is also kept close to zero.

FIG. 3 also illustrates, with respect to bridge voltage $V_{AB}$, the modulation of the duty ratio of primary-side switches $S_{bp}$ and $S_{bn}$. As illustrated by waveform 311 of FIG. 3, when the duty ratio of switch $S_{bp}$ is changed by amount $d_{pn}$ and the duty ratio of switch $S_{bn}$ in the same leg of bridge BR1 is simultaneously changed by amount $-d_{pn}$, negative bridge voltage $V_{ABN}$ is modulated by $d_{pn}$. As shown in FIG. 3, modulation is not made during positive half-periods of bridge voltage $V_{AB}$. With this one-sided modulation, the negative volt-second product across inductor $L_{AC}$ is adjusted to balance the flux between the positive and negative half-periods, thereby maintaining average inductor current $R_S$*$i_{P(AV)}$ substantially zero.

Other variations of modulating a duty ratio of bridge voltage $V_{AB}$ different from that in DAB converter 200 of FIG. 2 are also possible. For example, primary-side switches $S_{an}$ and $S_{ap}$ can be modulated instead of switches $S_{bn}$ and $S_{bp}$, so that a duty ratio of bridge voltage $V_{AB}$ is modulated only during positive half periods. It is also possible to modulate all four switches of bridge BR1, so that duty ratios of bridge voltage $V_{AB}$ are modulated in both the positive and negative half periods. In that case, the duty ratio modulations of $V_{AB}$ during positive and negative half periods are arranged so that they are adjusted in opposite directions.

To prevent transformer saturation effectively, current-control feedback loop 210 that keeps average magnetizing current $i_{M(AV)}$ substantially zero is preferably very fast, i.e., having a high loop bandwidth, as the current-control feedback loop must respond to any transformer core flux imbalances quickly. This requirement precludes the use of any circuit element or operation in the current-control feedback loop that introduces a significant delay (e.g., a low-pass filter). Therefore, the time that averaging block AVG requires to extract average magnetizing current $i_{M(av)}$ from the magnetizing current waveform should be minimized. For example, in a digital implementation, one method directly samples the average magnetizing current by synchronizing the sampling instants either with the middle of positive voltage $V_{CDP}$ or middle of negative voltage $V_{CDN}$ in FIG. 3. If this method cannot provide satisfactory performance because of potential noise problems, average magnetizing current $i_{M(av)}$ can be calculated from the sum of two samples taken one-half of the switching period apart (i.e., the samples are 180° out of phase) since magnetizing current $i_M$ has a waveform which exhibits odd symmetry. This averaging approach—which is less sensitive to noise, as compared to the direct average-sampling method—also offers an adequately short averaging time. The two-sample averaging can be either implemented by averaging two samples taken during the same switching period, or as a moving average by averaging two consecutive samples that are alternatively taken during the same switching period and during two consecutive switching periods. To provide a fast loop response, compensator $K_{FB}$ can be implemented by a proportional compensator with either a constant gain or an adaptive gain. A high-frequency noise filter can be added to current-control feedback loop 210 to attenuate high-frequency noise, such as switching-frequency noise.

The bandwidth of current-control feedback loop 220 that maintains average primary current $i_{P(av)}$ substantially zero may be lower than the bandwidth of current-control feedback loop 210 that maintains average magnetizing current $i_{M(av)}$ substantially zero, as primary inductor $L_{AC}$ is designed to carry a substantial DC current without saturating its magnetic core, while transformer TR is not designed to carry a substantial DC current without saturating its magnetic core. By separating the bandwidths of current-control loops 210 and 220, i.e., by limiting interaction between current-control feedback loops 210 and 220, robust control of DAB converter 200 is achieved. Slower current-control feedback loop 220 allows averaging of primary current $i_P$ to be implemented by low-pass filter LPF. Compensator $K_{CB}$ in current-control feedback loop 220 can be implemented by an integral-only, integral and proportional, or proportional-only compensator.

The bandwidths of output-voltage feedback loops 230 and 240 are also separated from the bandwidths of current-control feedback loops 210 and 220 to avoid undesirable loop interactions. Typically, the bandwidths of output-voltage feedback loops 230 and 240 may be less than the bandwidth of the fast flux-balancing control loop (i.e., current-control feedback loop 210) and greater than the bandwidth of current-control feedback loop 220 (i.e., the slow current-balancing loop). However, depending on the application, other bandwidth assignments are possible.

Figure 4:
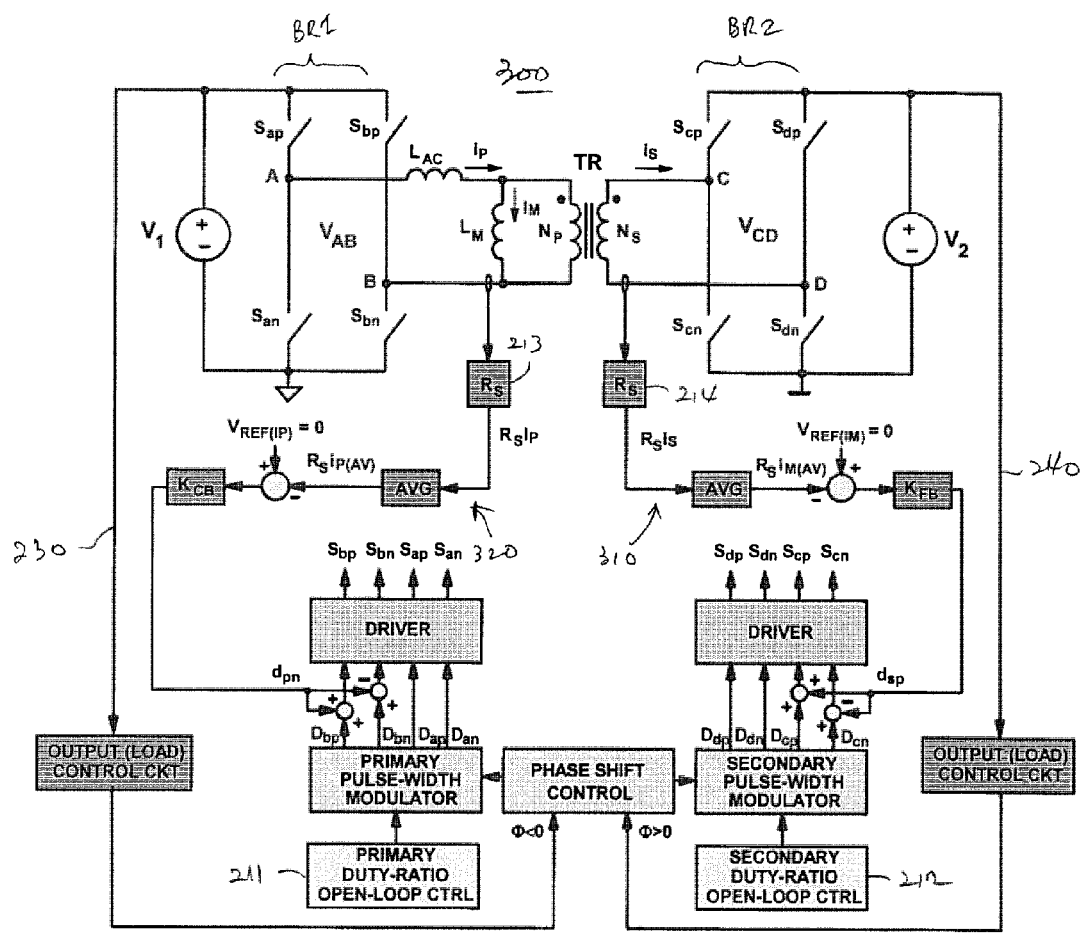
FIG. 4 shows DAB converter 300, in which flux-balancing control loops regulate the average primary current and the average secondary current, in accordance with one embodiment of the present invention.

FIG. 4 shows DAB converter 300, in which the flux-balancing control loops (i.e., the current-control feedback loops that maintain average magnetizing current $i_M$ substantially zero) regulate the averages of the primary current and the secondary current. In FIG. 4, average primary current $i_{P(av)}$ and average secondary current $i_{S(av)}$ are each regulated to substantially zero by respective current-control feedback loops 310 and 320, which also make average magnetizing current $i_{M(av)}$ substantially zero. Since flux-balancing in transformer TR requires a fast response control, both current-control feedback loops 310 and 320 are preferably implemented as fast loops (i.e., designed with sufficiently high bandwidths).

The above detailed description is provided to illustrate specific embodiments of the present invention and is not intended to be limiting. Numerous variations and modifications within the scope of this invention are possible. The present invention is set forth in the accompanying claims.

We claim:

1. An isolated bidirectional converter, comprising:
   an inductor;
   a transformer in series with the inductor;
   a first bridge circuit having first and second pairs of complementary switches operating alternately to provide a first current flowing to and from the inductor;
   a second bridge circuit having first and second pairs of complementary switches operating alternately to provide a second current flowing to and from the transformer;
   a first current-control feedback loop regulating the first current; and
   a second current-control feedback loop regulating the magnetizing current of the transformer.

2. The isolated bidirectional converter of claim 1, wherein the second current-control feedback loop maintains an average of the magnetizing current substantially zero.

3. The isolated bidirectional converter of claim 1, wherein the second current-control feedback loop regulates the magnetizing current using a difference between the first current and a scaled second current, the scaled second current being proportional to the turns ratio between two windings of the transformer.

4. The isolated bidirectional converter of claim 3, wherein the second current-control feedback loop maintains an average of the difference substantially zero.

5. The isolated bidirectional converter of claim 2, wherein the average is obtained from samples of the magnetizing current.

6. The isolated bidirectional converter of claim 2, wherein the average is obtained from a single sample of the magnetizing current.

7. The isolated bidirectional converter of claim 2, wherein the average is obtained by summing two or more samples of the magnetizing current taken one-half of a switching period apart.

8. The isolated bidirectional converter of claim 1, wherein the second current-control feedback loop comprises a proportional compensator with either a constant gain or an adaptive gain.

9. The isolated bidirectional converter of claim 1, wherein the second current-control feedback loop has a higher bandwidth than the first current-control feedback loop.

10. The isolated bidirectional converter of claim 1, wherein the first current-control feedback loop maintains an average current of the first current substantially zero.

11. The isolated bidirectional converter of claim 10, wherein the average current is obtained using a low-pass filter.

12. The isolated bidirectional converter of claim 10, wherein the first current-control feedback loop further comprises an integral compensator, an integral and proportional, or a proportional-only compensator.

13. The isolated bidirectional converter of claim 1, wherein the second current-control feedback loop maintains an average current of the second current substantially zero.

14. The isolated bidirectional converter of claim 1, wherein the first and second current-control feedback loops each adjust a duty ratio in one of the first and second pairs of complementary switches during one half of a switching period of the corresponding bridge circuit.

15. The isolated bidirectional converter of claim 1, wherein the first and second current-control feedback loops each adjust duty ratios of both the first and second pairs of complementary switches in opposite directions.

16. The isolated bidirectional converter of claim 1, wherein the second current-control feedback loop has substantially the same bandwidth as the first current-control feedback loop.

17. The isolated bidirectional converter of claim 1, further comprising first and second power sources, coupled respectively to the first and second bridges.

18. The isolated bidirectional converter of claim 17, further comprising first and second feedback control loops for regulating the first and second power sources.

19. A method for regulating an isolated bidirectional converter that comprises an inductor, a transformer in series with the inductor, a first bridge circuit having first and second pairs of complementary switches operating alternately to provide a first current flowing to and from the inductor and a second bridge circuit having first and second pairs of complementary switches operating alternately to provide a second current flowing to and from the transformer, the method comprising:
   operating a first current-control feedback loop to regulate the first current; and
   operating a second current-control feedback loop to regulate the magnetizing current.

20. The method of claim 19, wherein the second current-control feedback loop maintains an average of the magnetizing current substantially zero.

21. The method of claim 19, wherein the second current-control feedback loop regulates the magnetizing current using a difference between the first current and a scaled second current, the scaled second current being proportional to the turns ratio between two windings of the transformer.

22. The method of claim 21, wherein the second current-control feedback loop maintains an average of the difference substantially zero.

23. The method of claim 20, wherein the average is obtained from samples of the magnetizing current.

24. The method of claim 20, wherein the average is obtained from a single sample of the magnetizing current.

25. The method of claim 20, wherein the average is obtained by summing two or more samples of the magnetizing current taken one-half of a switching period apart.

26. The method of claim 19, wherein the second current-control feedback loop comprises a proportional compensator with either a constant gain or an adaptive gain.

27. The method of claim 19, wherein the second current-control feedback loop has a higher bandwidth than the first current-control feedback loop.

28. The method of claim 19, wherein the first current-control feedback loop maintains an average current of the first current substantially zero.

29. The method of claim 28, wherein the average current is obtained using a low-pass filter.

30. The method of claim 28, wherein the first current-control feedback loop further comprises an integral compensator, an integral and proportional, or a proportional-only compensator.

31. The method of claim 19, wherein the second current-control feedback loop maintains an average current of the second current substantially zero.

32. The method of claim 19, wherein the first and second current-control feedback loops each adjust a duty ratio in one of the first and second pairs of complementary switches during one half of a switching period of the corresponding bridge circuit.

33. The method of claim 19, wherein the first and second current-control feedback loops each adjust duty ratios of both the first and second pairs of complementary switches in opposite directions.

34. The method of claim 19, wherein the second current-control feedback loop has substantially the same bandwidth as the first current-control feedback loop.

35. The method of claim 19, further comprising first and second power sources, coupled respectively to the first and second bridges.

36. The method of claim 35, further comprising first and second feedback control loops for regulating the first and second power sources.

* * * * *